US006634509B2

(12) United States Patent
Ochi

(10) Patent No.: US 6,634,509 B2
(45) Date of Patent: Oct. 21, 2003

(54) FILTRATION APPARATUS

(75) Inventor: Masao Ochi, Osaka (JP)

(73) Assignee: Kurabo Industries Ltd., Kurashiki (JP)

( * ) Notice: Subject to any disclaimer, the term of this patent is extended or adjusted under 35 U.S.C. 154(b) by 0 days.

(21) Appl. No.: 09/815,133

(22) Filed: Mar. 22, 2001

(65) Prior Publication Data
US 2001/0025816 A1 Oct. 4, 2001

(30) Foreign Application Priority Data
Mar. 31, 2000 (JP) .......................... 2000-097785

(51) Int. Cl.[7] .............................................. B01D 35/34
(52) U.S. Cl. .................. 210/437; 210/440; 210/455; 210/456; 210/457; 210/458
(58) Field of Search ................... 210/306, 315, 210/440, 443, 444, 456, 484, 485, 493.2, 497.01, 457, 493.1, 437, 458, 305, 455, 489; 55/482, 498, 501

(56) References Cited

U.S. PATENT DOCUMENTS 3,342,332 A * 9/1967 Kudlaty ...................... 210/130
4,609,465 A * 9/1986 Miller ....................... 210/323.2
4,663,041 A * 5/1987 Miyagi et al. ............. 210/493.2
5,776,342 A   7/1998 Hiranaga et al.
5,798,049 A * 8/1998 Proulx et al. ............. 210/321.74

FOREIGN PATENT DOCUMENTS

| JP | 05064728 | 3/1993 |
|---|---|---|
| JP | 6-96101 | 11/1994 |
| JP | 08192006 | 7/1996 |
| JP | 10337447 | 12/1998 |

* cited by examiner

Primary Examiner—Matthew O. Savage
(74) Attorney, Agent, or Firm—W. F. Fasse; W. G. Fasse

(57) ABSTRACT

There can be obtained an ecological filtration apparatus providing a sufficient function of precise filtration while contributing to saving resources and minimizing refuse. The filtration apparatus includes a housing having an inlet and an outlet, an outer cylinder fixed to the housing, and a cartridge filter formed mainly of a cylindrical filter, an inner cylinder and end caps. The cartridge filter is detachably attached to the housing, housed in the outer cylinder, blocking a channel extending from the inlet to the outlet.

5 Claims, 11 Drawing Sheets

FILTRATION APPARATUS

BACKGROUND OF THE INVENTION

1. Field of the Invention

The present invention relates generally to filtration apparatus and cartridge filters for use for example in the field of semiconductor production, food industry, pharmaceutical industry and the like and methods of attaching the same, and particularly to filtration apparatus and cartridge filters reliably achieving precision filtration while saving a component associated with the filter and periodically exchanged as the filter's filtration performance is chronologically impaired and methods of attaching the same.

2. Description of the Background Art

In the fields of electronic component industry, food industry, pharmaceutical industry, pure-water production and the like, filtration apparatus are widely used. For example, electronic components are washed with highly pure agents. If impurity, metal particles or the like in particular, are introduced into these agents, it causes a short circuit or the like between fine interconnections of the semiconductor integrated circuit and the circuit can no longer be expected to normally function. Agents used to wash semiconductor substrates can be repeatedly used and they are thus recycled to safeguard resources, protect environment and also reduce the cost for manufacturing semiconductor devices. However, as has been described above, small metal particles and the like are introduced during the washing and agent recovery process. As such the introduced matters are removed via a filter and then recycled. The filter, initially clean, becomes foul in time as residue attributed to filtering an introduced matter accumulates. The filter in the end would be clogged and no longer sufficiently filter fluid. Accordingly, the filtration apparatus employs a filter periodically exchanged after a set period for use over which the filter's filtration ability decreases and thus reaches a predetermined level. Thus, a cartridge filter has been used to facilitate exchanging the filter.

FIG. 5 is a view for illustrating a conventional cartridge filter. A housing 110 is configured of a bowl 111, a bag nut 112 and a head 113. Bowl 111 has a step, which engages with a bottom edge of bag nut 112. Head 113 is threaded into bag nut 112 to press an O ring 122 and fix the engagement to integrate bowl 111, bag nut 112 and head 113 together as the housing. Head 113 and bowl 111 have their boundary sealed by O ring 122. Housing 110 has an outlet 115 having an internal opening, which corresponds to a filter receiving portion 125 receiving an attachment 108 of cartridge filter 101. Cartridge filter 101 is configured of an outer cylinder 102, a filter 103 surrounded by the outer cylinder, an inner cylinder (not shown), and top and bottom end caps 106 and 105 fixed to the filter at the top and bottom ends, respectively, fluid-tight. At least one of the two end caps has an opening communicating with the outlet or the inlet. In FIG. 5, top end cap 106 has an opening 107 communicating with outlet 115. Opening 107 also serves as attachment 108 protruding from the end cap outward and inserted into filter receiving portion 125 and attached thereto to allow an O ring 121 fit on the attachment to provide sealing. The attachment attaches through a force provided by a reaction force of O ring 121. In housing 110, head 113 is provided with inlet 114 and outlet 115 arranged to allow fluid to be filtered to be introduced through the inlet, pass through filter 103 and reach the outlet. Head 113 also has a pressure gage connection 116 also serving as an air exhaust port, an air exhaust port 117 and a pressure gage connection 118. Furthermore the bowl has a fluid exhaust port 119. It is needless to say that the air exhaust ports, the fluid exhaust port and the like are closed in operation.

FIG. 6 illustrates a procedure of assembling the FIG. 5 filter apparatus. It can be clearly understood from FIG. 6 that the filter apparatus is configured of integrated filter 101, head 113 and bowl 111. Furthermore, in FIG. 7, attachment 108 with O ring 121 fit thereon is attached to the head's receiving recess and cartridge filter 101 is thus attached to housing 110.

Using the cartridge filter as described above allows the cartridge filter to be conveniently, periodically exchanged to maintain the filter's ability of precision filtration having at least a predetermined level.

However, whether exchanging the cartridge filter in the manner as described above is the best way is still an issue to be addressed in order to save resources, minimize refuse, achieve cost reduction, and the like. More specifically, whether exchanging an outer cylinder, a filter, an inner cylinder and top and bottom end caps as one cartridge is the best way or not, is needed to be considered. Desirably, a cartridge should provide a sufficient function of precise filtration while it should have any component thereof saved if possible to contribute to saving resources and minimizing refuse as much as possible.

SUMMARY OF THE INVENTION

The present invention contemplates an ecological filtration apparatus and cartridge filter providing a sufficient function of precision filtration while contributing to saving resources and minimizing refuse and a method of attaching the same.

The present invention provides a filtration apparatus including: a housing having an inlet and an outlet; an outer cylinder fixed to the housing; and a cartridge filter configured mainly of a cylindrical filter, an inner cylinder positioned internal to the cylindrical filter and end caps fluid-tight fixed to top and bottom ends, respectively, of the cylindrical filter. The cartridge filter is detachably attached to the housing, accommodated in the outer cylinder, blocking a channel extending from the inlet to the outlet.

Thus, the outer cylinder serves as a housing member and it is not exchanged. This can reduce refuse otherwise corresponding to the outer cylinder and also contribute to saving resources. Furthermore, the material(s) for the outer cylinder can be saved and the cost therefor can thus be saved if the cost for considerations including packing is taken into account. The present filtration apparatus provides a function of precision filtration equal to that of conventional filtration apparatus. Note that the aforementioned cartridge filter corresponds to the ecological cartridge filter of the present invention.

In the above one aspect desirably the filtration apparatus for example has at least one of the end caps that has an opening communicating with the outlet.

Thus, the outer cylinder is positioned close to the inlet receiving a fluid to be filtered and the inner cylinder is positioned close to the outlet outputting the fluid having been filtered. As such in the present invention the inner cylinder, close to the outlet outputting a filtered fluid, is exchanged. This can maintain clean the inner cylinder close to a portion passing a filtered, highly pure agent. The outer cylinder, which is a portion contacting a fluid before it is filtered, is not particularly disadvantageous if it is not exchanged.

Thus, resources can be saved and refuse can be minimized while precision filtration can be achieved to constantly supply a highly pure agent.

In the above one aspect the filtration apparatus can for example be detachably attached and thus fixed to the housing.

As such, if the outer cylinder is for example accidentally damaged the outer cylinder can be independently exchanged. Furthermore, if between the outer cylinder and the filter the outer cylinder's inner surface is for example severely contaminated the outer cylinder can be removed and cleaned with an agent. Thus, precision filtration can be constantly provided to supply a highly pure agent.

The present invention provides a cartridge filter detachably attached to a housing, arranged internal to an outer cylinder fixed to the housing. The cartridge filter includes: a cylindrical filter; an inner cylinder positioned internal to the cylindrical filter; and end caps fluid-tight fixed to top and bottom ends, respectively, of the cylindrical filter.

The ecological cartridge filter configured as above can eliminate the necessity of exchanging the outer cylinder that essentially does not have a significant effect on the filter's performance. This can in turn eliminate the necessity of producing and selling a component other than the ecological cartridge filter, a portion essentially requiring exchanging, to save resources and reduce refuse.

The present invention provides a method of attaching a cartridge filter, including the steps of: with a filtration apparatus having a housing released, inserting into an outer cylinder fixed to the housing a cartridge filter formed mainly of a cylindrical filter, an inner cylinder and top and bottom end caps, to attach the cartridge filter to the housing; and sealing the housing having the cartridge filter attached thereto, to form a channel extending from an inlet to an outlet.

Thus, the outer cylinder can almost be free from exchange or it can be exchanged less frequently than the filter. This can save resources corresponding to the outer cylinder and reduce refuse otherwise corresponding to the outer cylinder.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
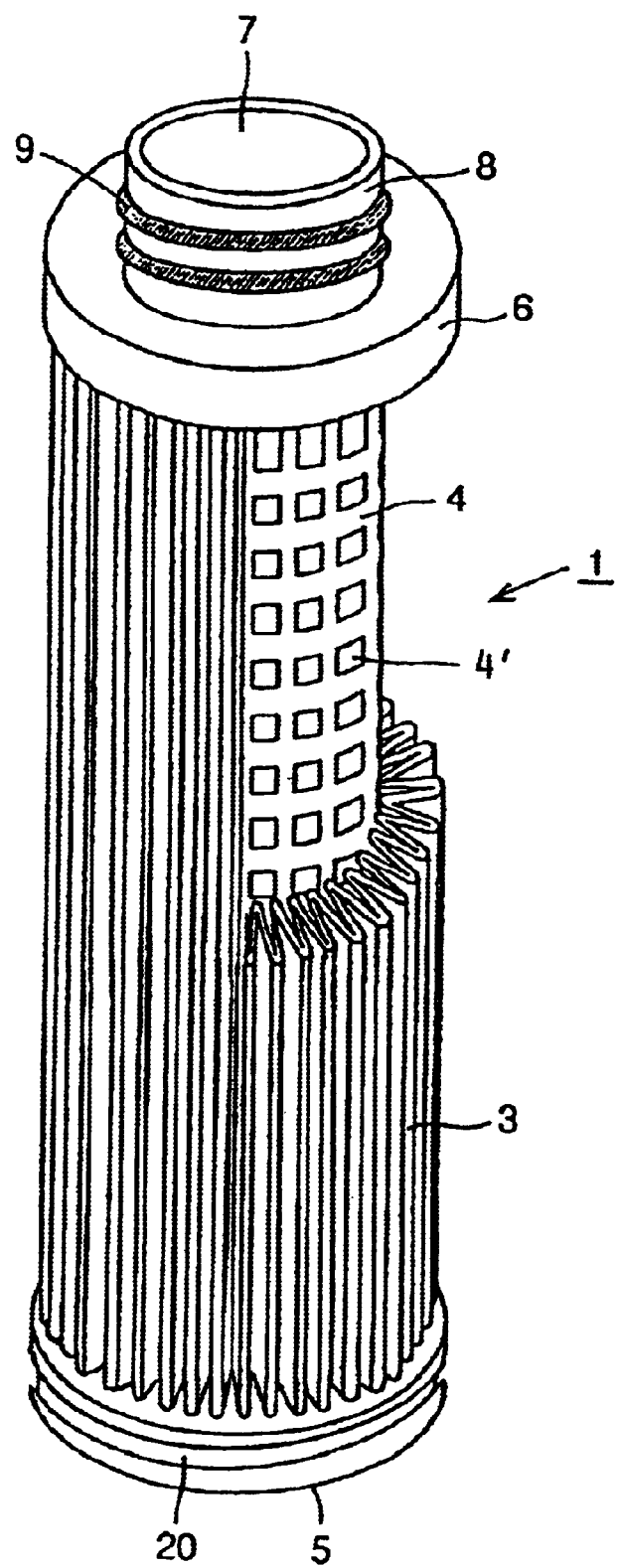
FIG. 1 shows an ecological cartridge filter for use with a filtration apparatus in one embodiment of the present invention.

FIG. 1 shows an ecological cartridge filter 1 for use with a filtration apparatus of the present invention. Filter 3, having a cylindrical outer geometry and pleated, is shown partially cut away to show an inner cylinder 4. A top end cap 6 is provided with an attachment 8 also serving as an opening 7 and having two O rings 9 fit thereon. Note that attachment 8 may be provided on the housing. In this example, the housing's attachment is fit into an opening of the end cap. A bottom end cap is circumferentially provided with a groove 20 for setting a jig used in detaching the ecological cartridge filter from the housing. A significant feature of the FIG. 1 ecological cartridge filter is that the filter does not have an outer cylinder.

Figure 2:
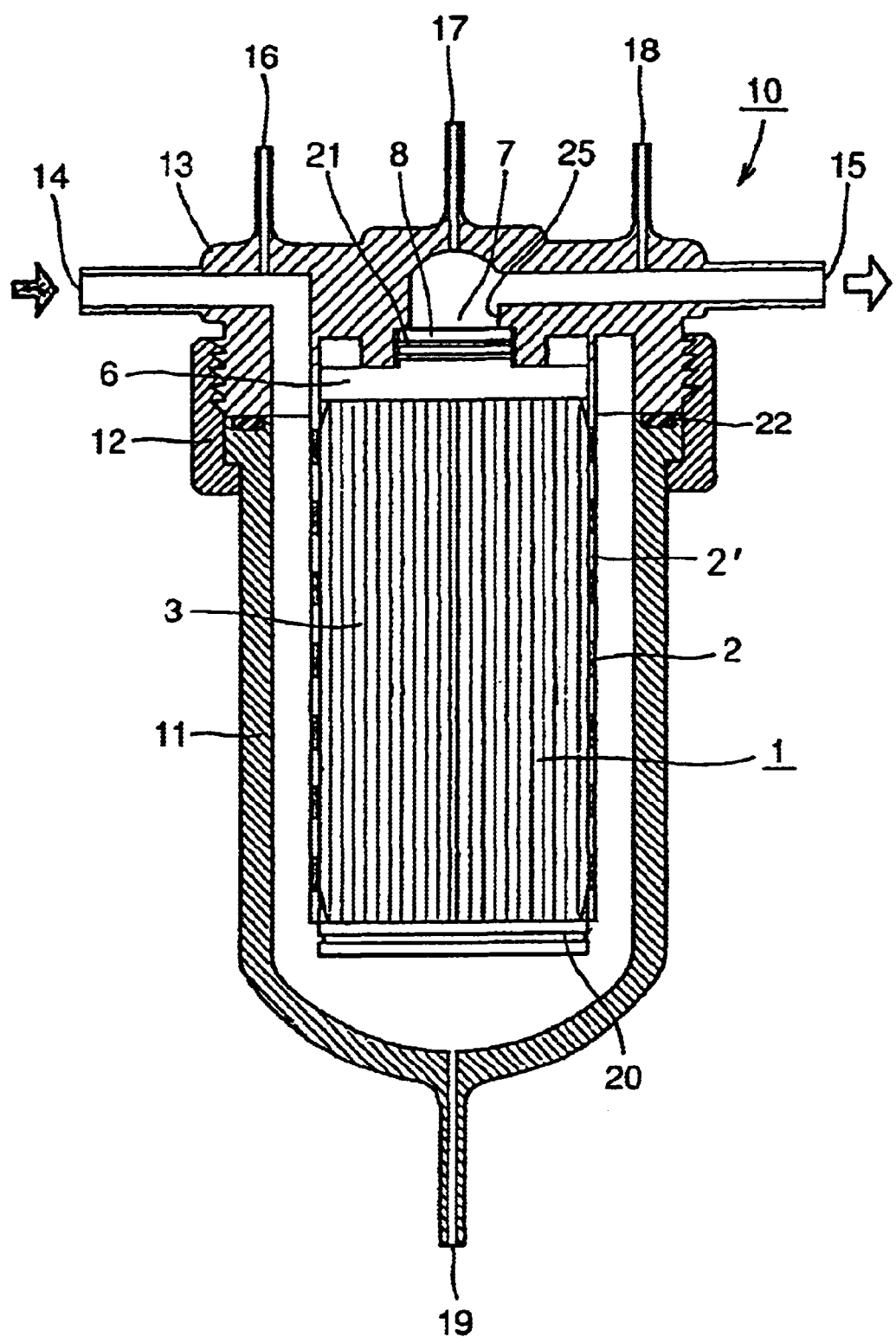
FIG. 2 is a view for illustrating a filtration apparatus of the present embodiment.

FIG. 2 is a view for illustrating the ecological cartridge filter attached to housing 10. The filter's attachment 8 is inserted into a filter receiving portion 25 corresponding to an inner opening of an outlet 15 of housing 10, to attach the filter to the housing. Housing 10 is configured of an outer cylinder 2, a head 13, a bag nut 12 and a bowl 11. Bag nut 12, engaged with a step of bowl 11, receives head 13 threaded thereinto, and an O ring 22 inserted between the head and the bowl provides sealing to prevent an agent from leaking externally.

Figure 8A:
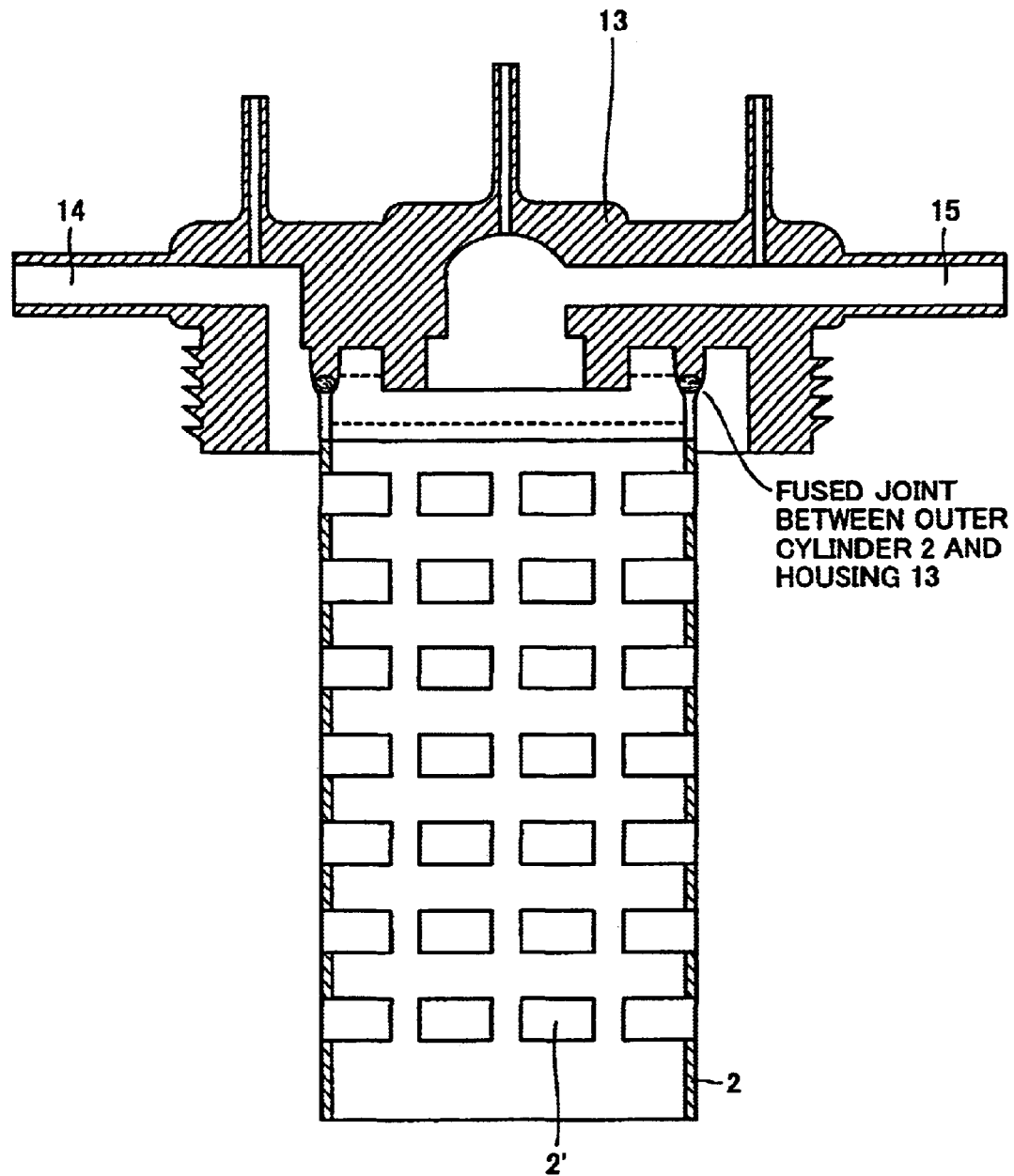
Figure 8B:
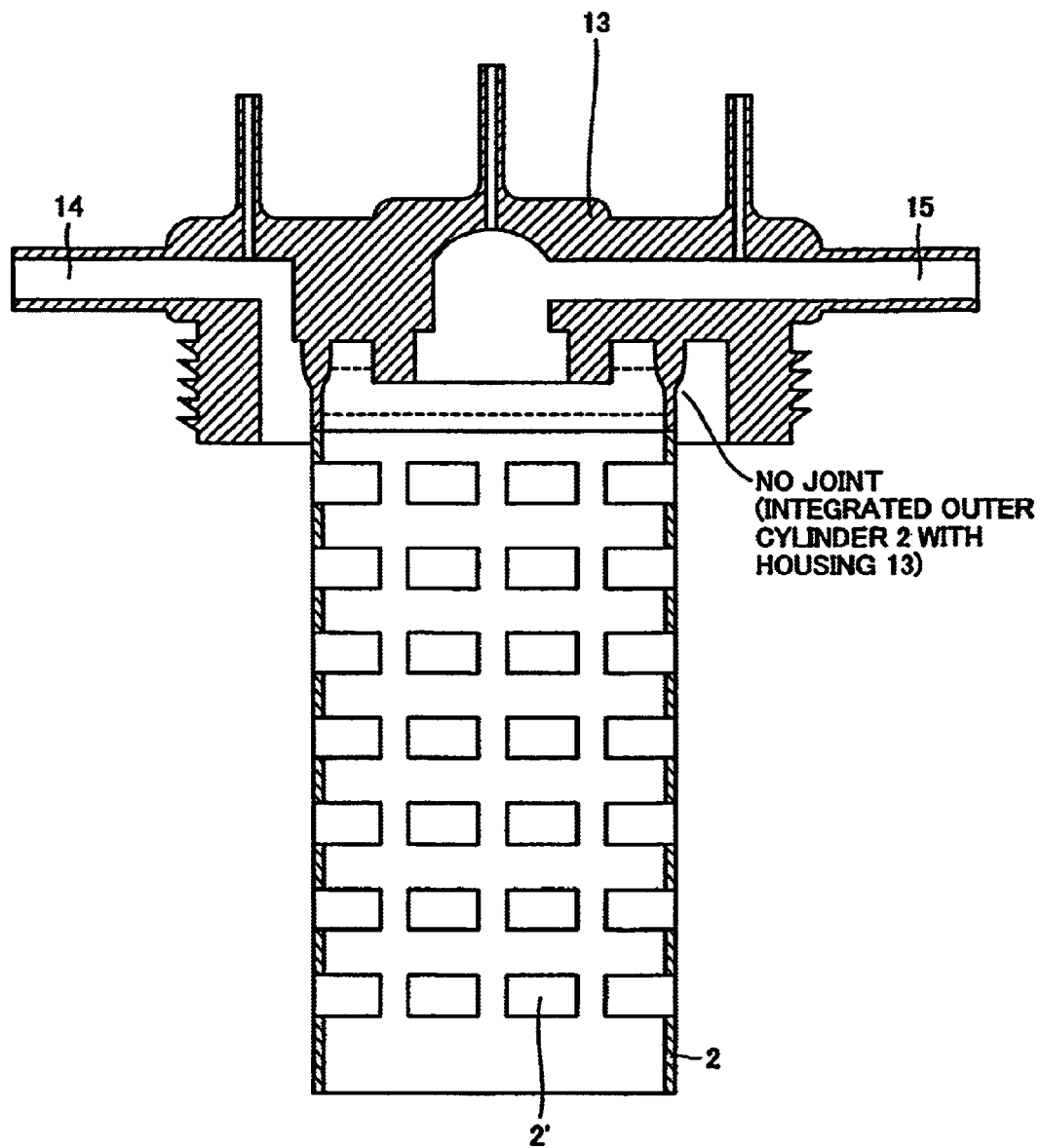
Figure 8C:
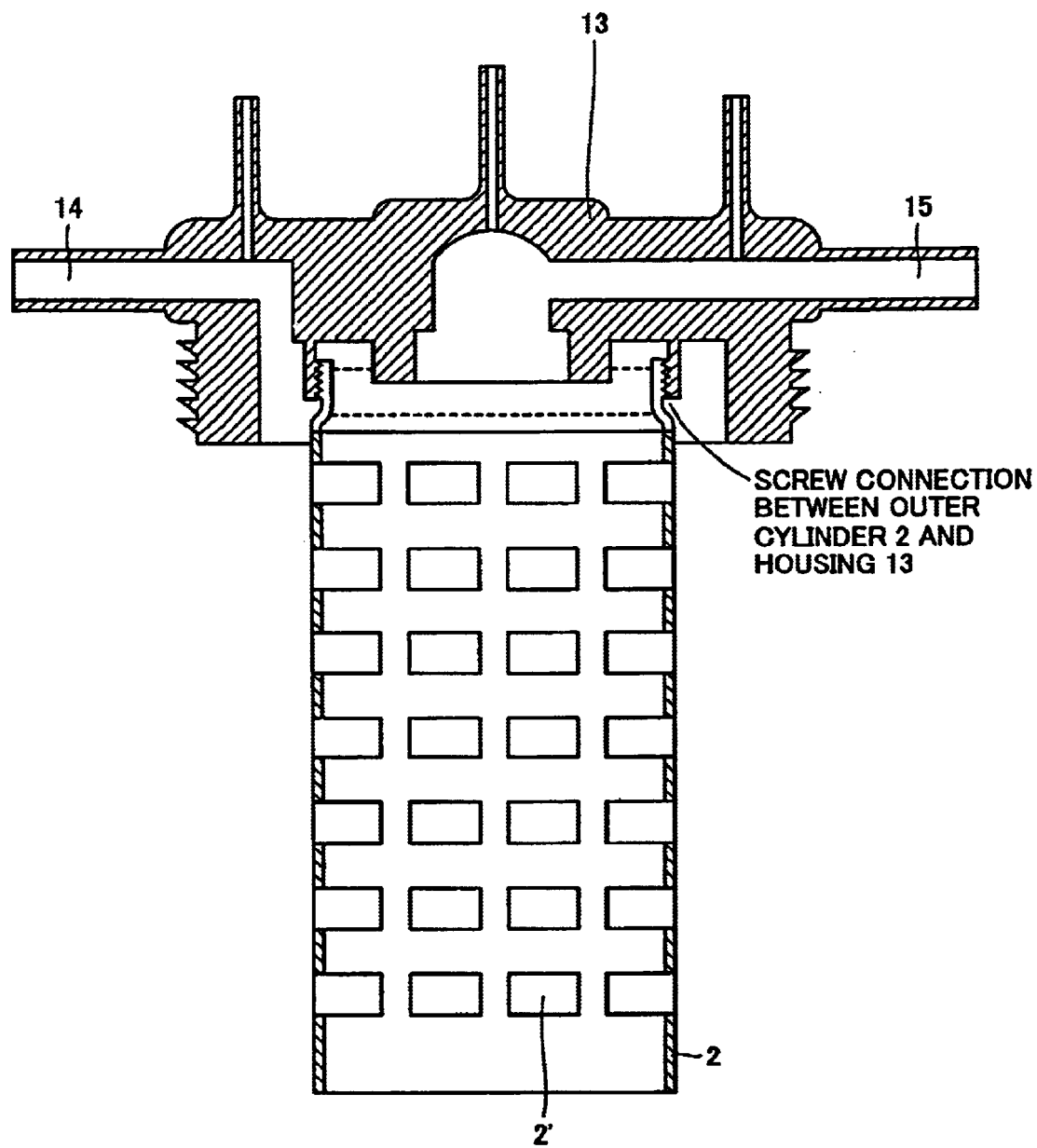
Figure 8D:
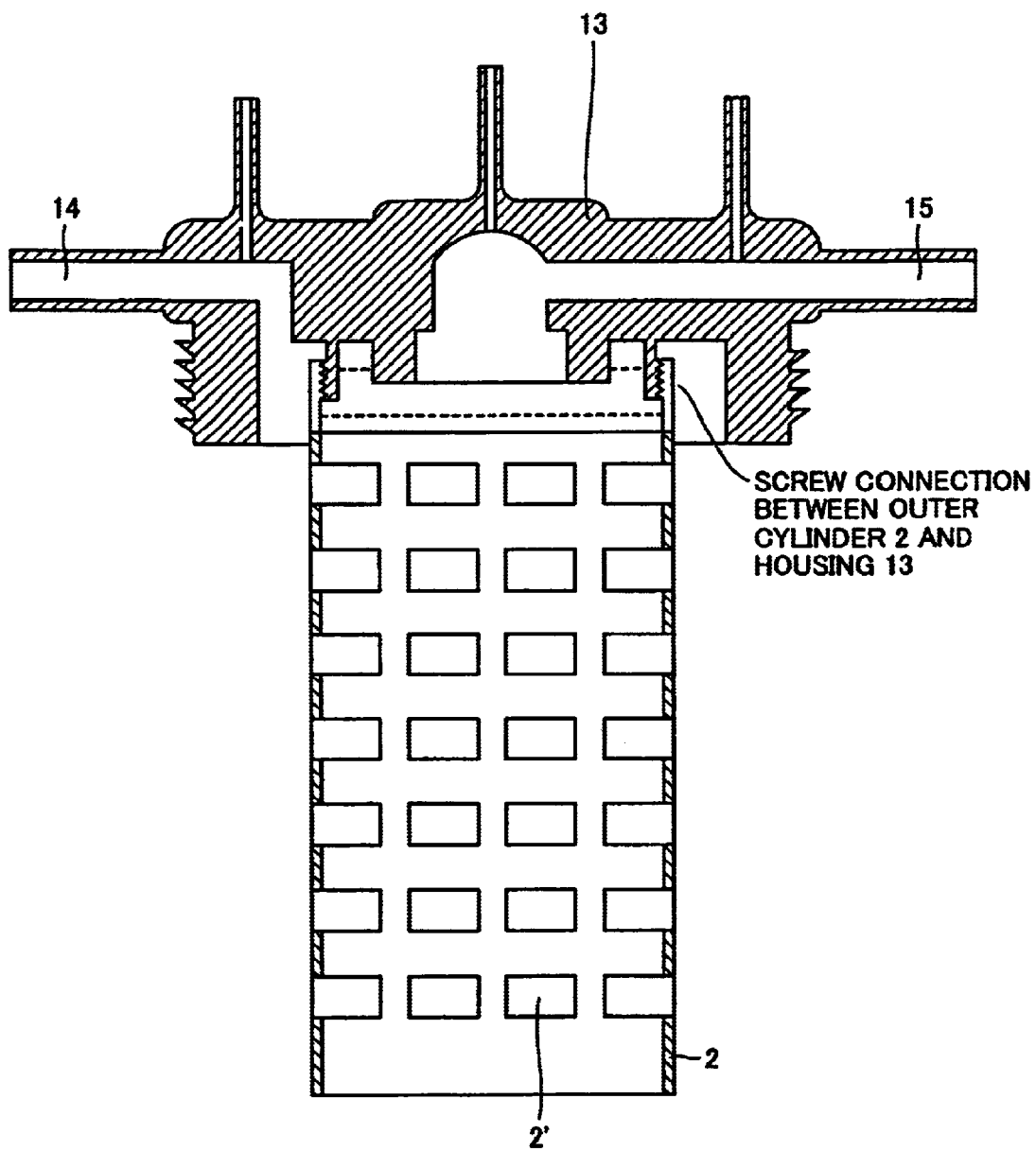

The present embodiment is characterized in that outer cylinder 2 is fusion-bonded to head 13 and thus fixed thereto (FIG. 8a). Outer cylinder 2 may alternatively be molded integral to head 13 (FIG. 8b). Alternatively, the head that is externally (FIG. 8c) or internally (FIG. 8d) threaded and the outer cylinder that is internally or externally threaded may engage with each other to fix the outer cylinder to the head. Engaging the threaded outer cylinder with the threaded head allows the cartridge to be exchanged if the cartridge is accidentally damaged. It also allows the cartridge to be washed with an agent or exchanged for example if the cartridge is severely contaminated. Ecological cartridge filter 1 is attached to filter receiving portion 25 through a force provided by a reaction force of two O rings 21. These two O rings also provide sealing to ensure that an agent introduced through inlet 14 flows past the cylindrical, pleated filter.

An agent to be filtered is introduced through inlet 14 and arrives at outer cylinder 2 and it is filtered, flowing through the outer cylinder's pores and past pleated filter 3. The filtered agent flows through the inner cylinder's pores and then through opening 7 of attachment 8 protruding from top end cap 6. The agent is thus resupplied and thus reused. Opening 7 may be provided not only at the top end cap but also the bottom end cap to allow the both openings to communicate with the outlet. Outlet 15 may be used as an inlet receiving an agent, passing the agent in cross current, and inlet 14 may be used as an outlet outputting the agent.

Figure 3:
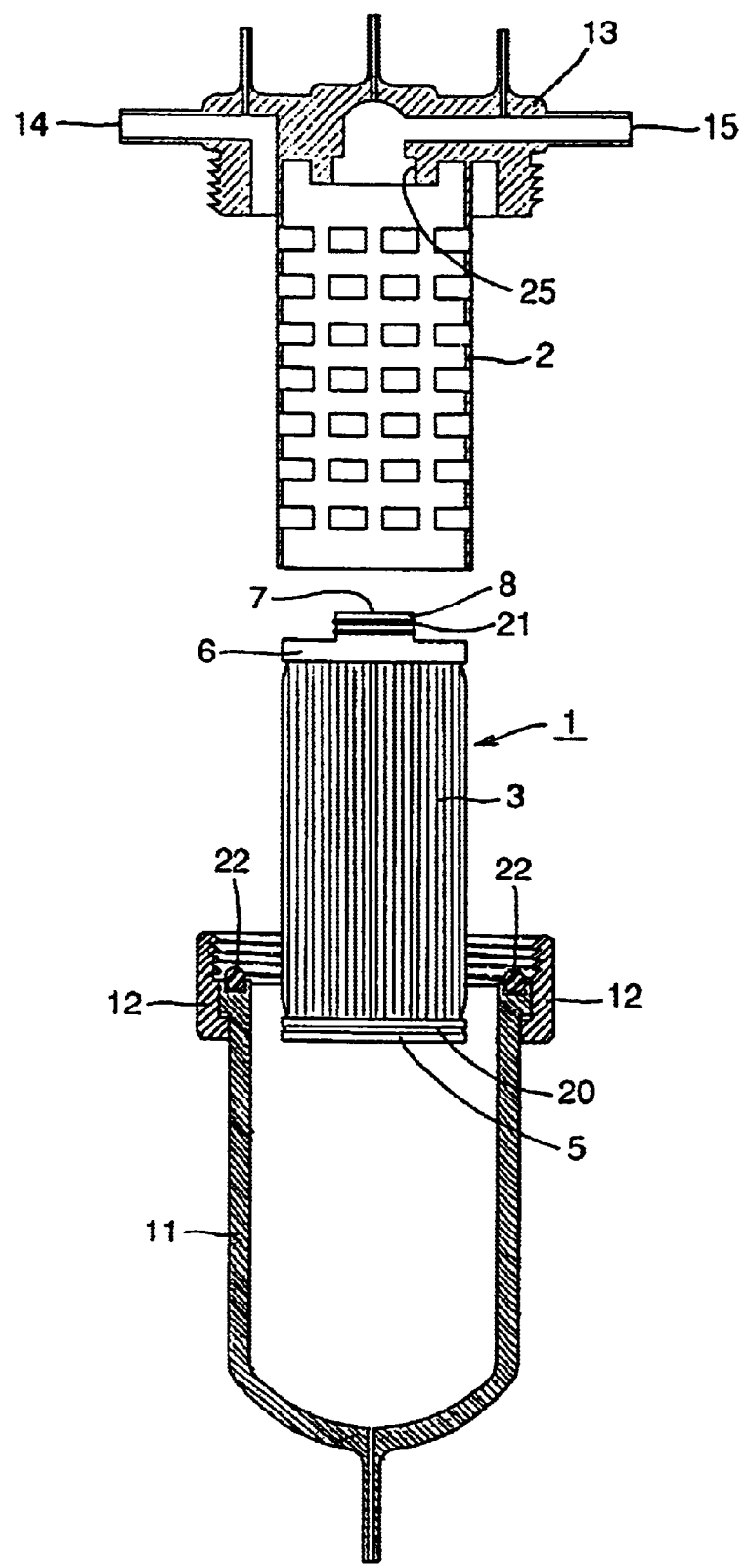
FIG. 3 shows the filtration apparatus of the present embodiment with the ecological cartridge filter and the head-integrated outer cylinder disassembled completely out of contact with each other.
Figure 4:
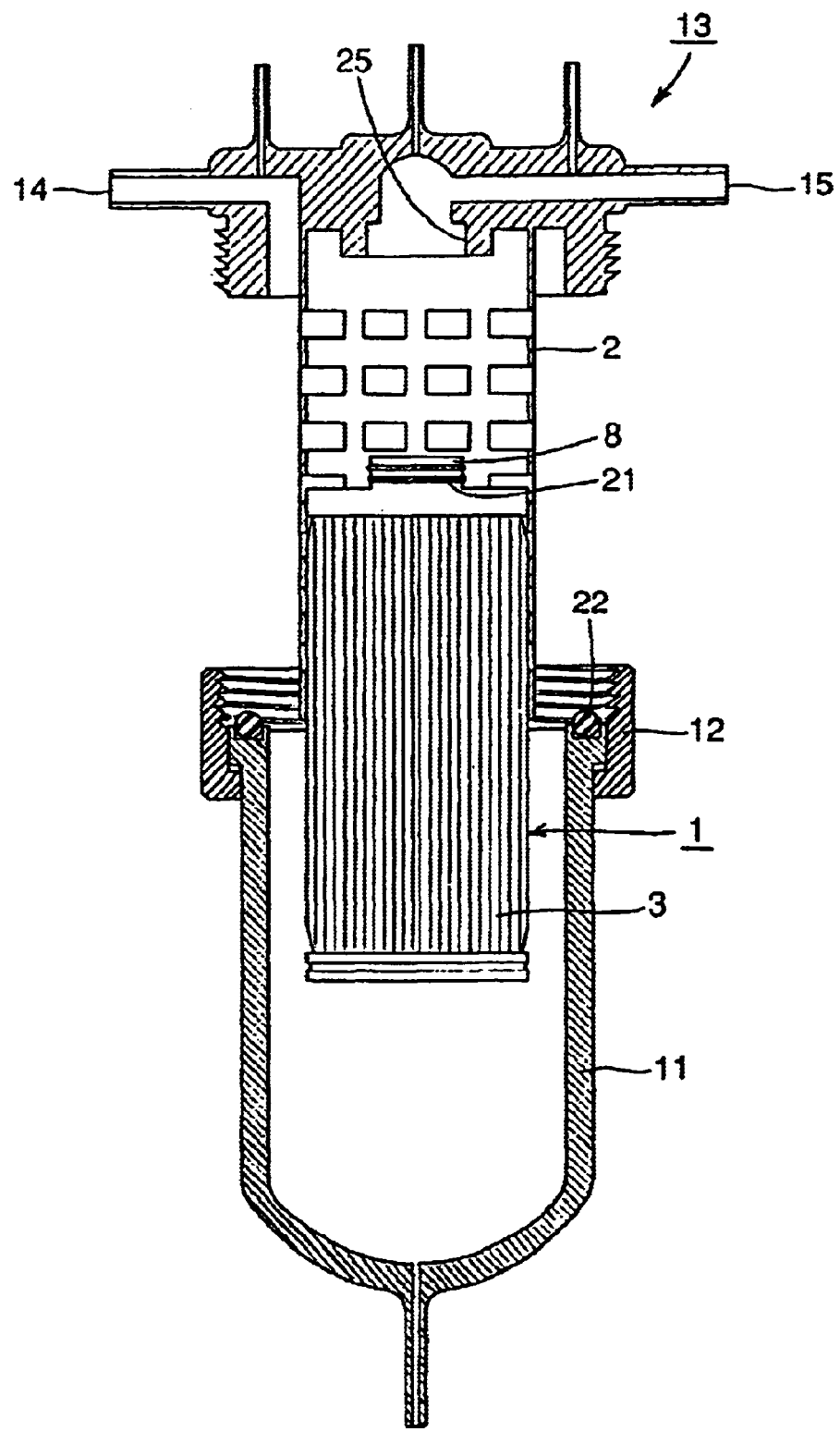
FIG. 4 shows the filtration apparatus of the present embodiment with the ecological cartridge filter and the head-integrated outer cylinder disassembled, although partially in contact with each other.
Figure 5:
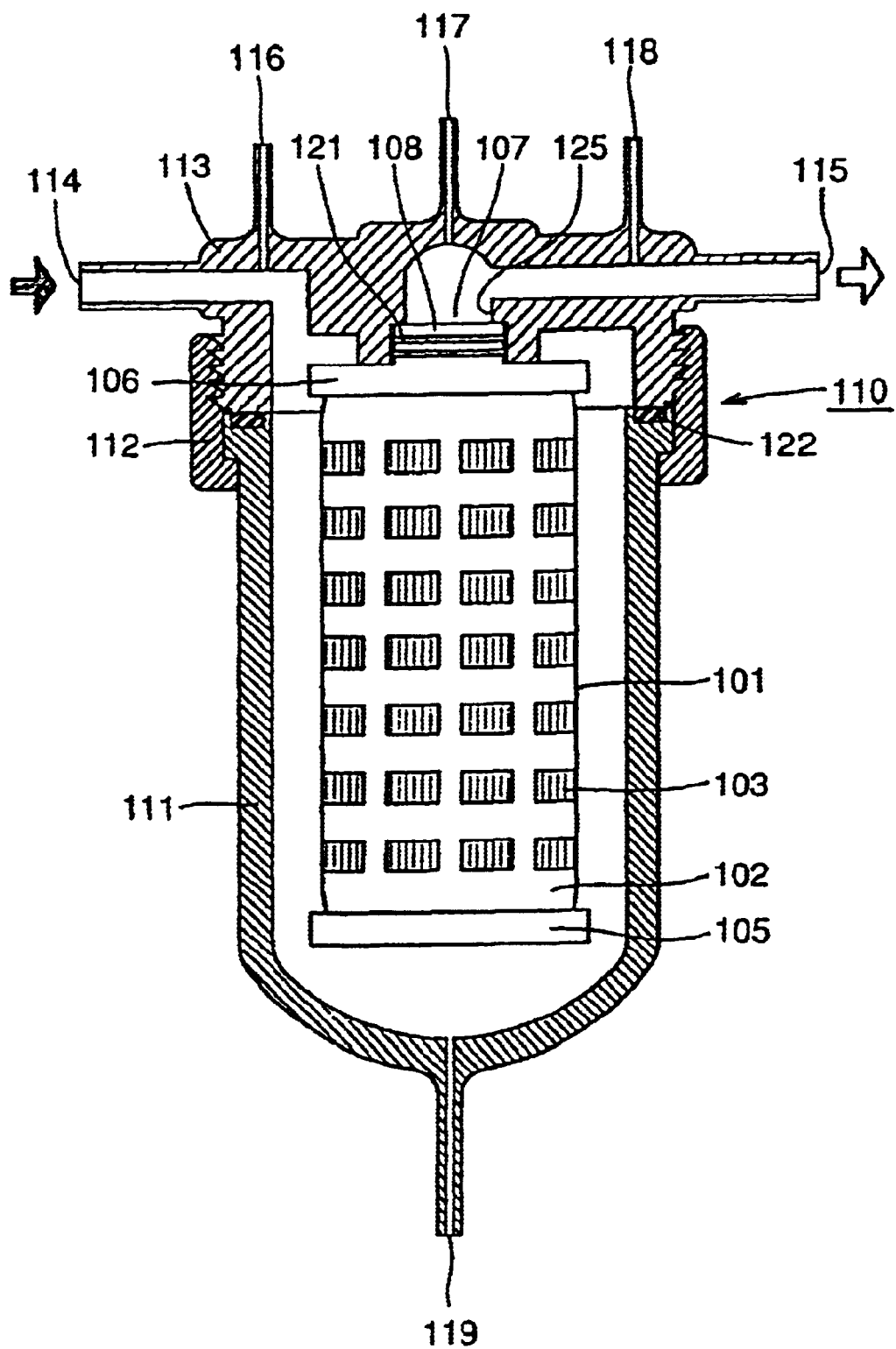
FIG. 5 is a view for illustrating a conventional filtration apparatus.
Figure 6:
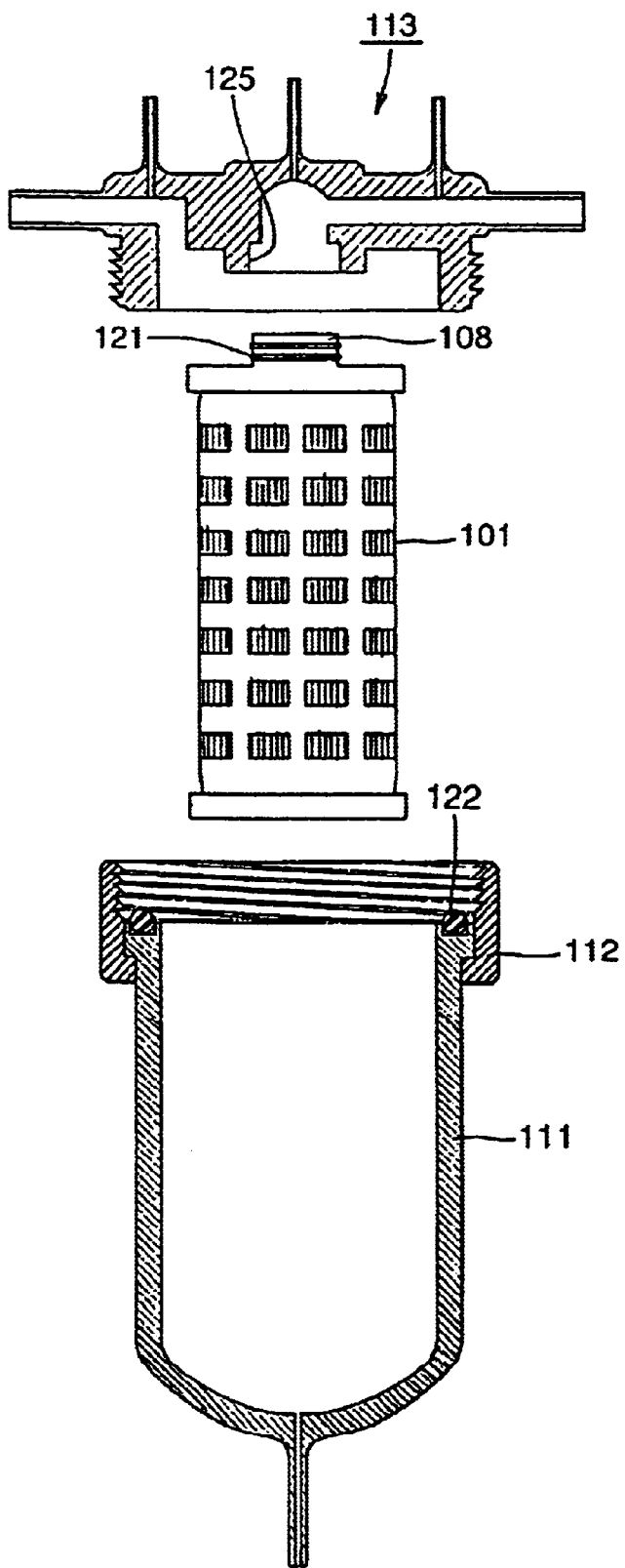
FIG. 6 shows a conventional filtration apparatus with the filter cartridge and the head disassembled completely out of contact from each other.
Figure 7:
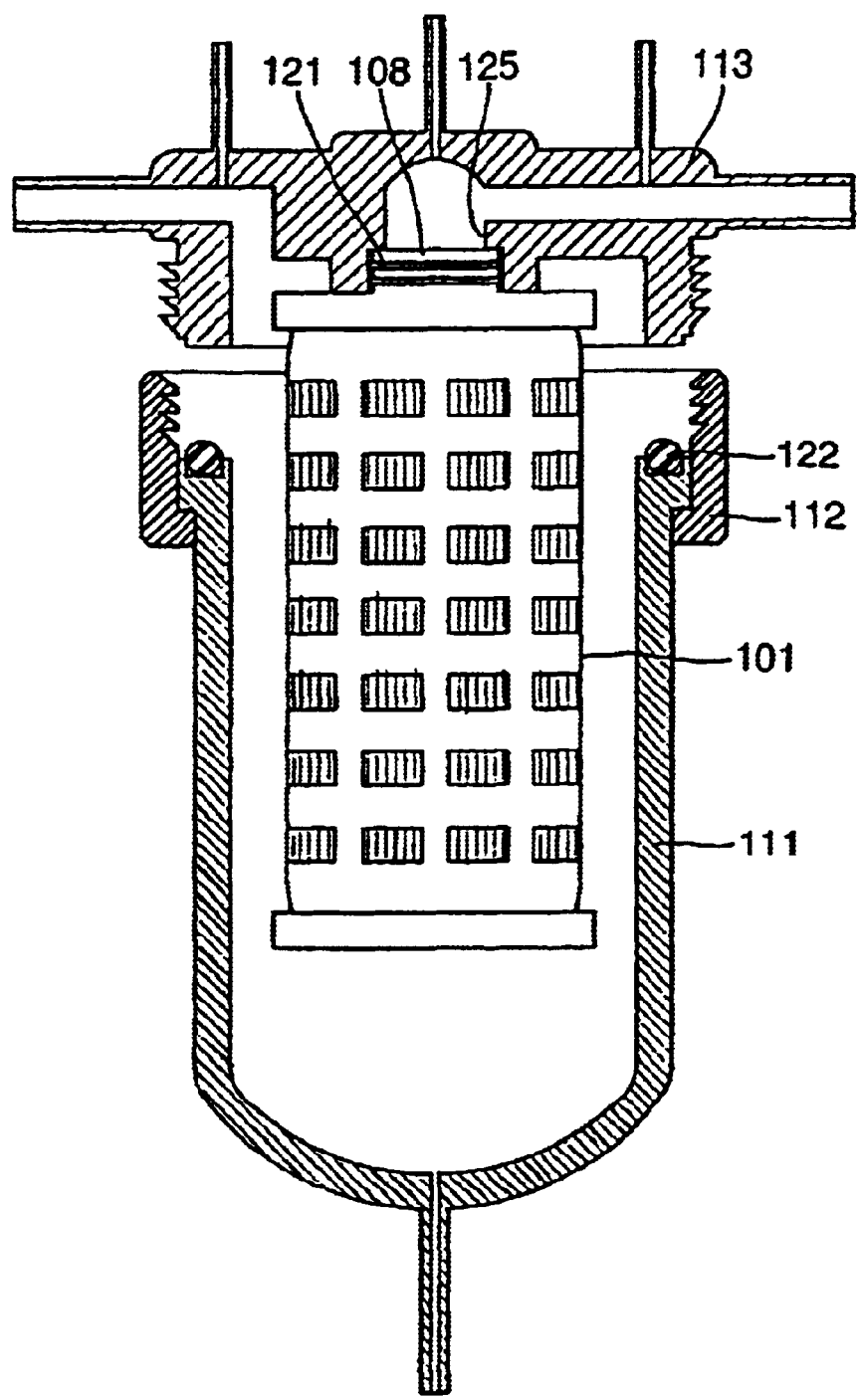
FIG. 7 shows a conventional filtration apparatus with the filter cartridge and the head disassembled, although partially in contact with each other; and, FIGS. 8a–8c show alternate connections between the filter head portion and outer cylinder.

FIG. 3 shows ecological cartridge filter 1 detached from the housing, and FIG. 4 shows ecological cartridge filter 1 detached from the housing, although partially in contact with outer cylinder 2. In both of the figures, the outer cylinder forms a portion of the housing. Thus it is not exchanged in exchanging the ecological cartridge filter and it can thus contribute to saving resources, minimizing refuse, achieving cost reduction, and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A filter for filtering a fluid, said filter comprising a housing (10) having an inlet (14) and an outlet (15), a filter cartridge removably secured inside said housing (10), said filter cartridge comprising a perforated inner cylinder (4), a filter member (3), said filter member surrounding said perforated inner cylinder (4), a first end cap (5) fixed in a fluid-tight manner to a first end of said filter member (3), and a second end cap (6) fixed in a fluid-tight manner to an opposite end of said filter member (3), a first connection for removably connecting said second end cap to said housing and for fluidly connecting an interior of said filter member to said outlet, said filter further comprising a separate outer cylinder (2) having an open free end and an opposite cylinder end, a second connection for connecting said opposite cylinder end to said housing in a position surrounding radially outwardly of said filter cartridge, whereby said filter cartridge is accommodated within said separate outer cylinder (2), and wherein both ends of said separate outer cylinder (2) are removable from said first and second end caps, said separate outer cylinder (2) having through holes for communicating said inlet with said outlet through said filter member (3) and through said perforated inner cylinder (4), and wherein said first end cap and said open free end of said separate outer cylinder (2) are spaced apart from and exclude any mechanical connections with said housing (10), whereby said filter cartridge is removable without removing said separate outer cylinder.

2. The filter of claim 1, wherein the second connection formed between said opposite cylinder end of said separate outer cylinder (2) and said housing is a fusion bonded connection to or molded connection with a head portion (13) of said housing (10).

3. The filter of claim 1, wherein said second connection of said separate outer cylinder (2) is a detachable connection.

4. The filter of claim 3, wherein said detachable connection comprises the head portion being internally threaded and the opposite cylinder end being externally threaded.

5. The filter of claim 3, wherein said detachable connection comprises the head portion being externally threaded and the opposite cylinder end being internally threaded.

* * * * *